(12) United States Patent
Park et al.

(10) Patent No.: US 8,942,084 B2
(45) Date of Patent: Jan. 27, 2015

(54) METHOD OF REDUCING RETRANSMISSION OF DATA FRAME AND RECEIVING NODE THEREFOR

(75) Inventors: Joun Sup Park, Gyunggi-do (KR); Chul Gyun Park, Gyunggi-do (KR); Sang Heon Pack, Seoul (KR); Jae Duck Ko, Seoul (KR)

(73) Assignees: Samsung Electro-Mechanics Co., Ltd., Suwon, Gyunggi-Do (KR); Korea University Research & Business Foundation, Seongbuk-Gu, Seoul (KR)

( * ) Notice: Subject to any disclaimer, the term of this patent is extended or adjusted under 35 U.S.C. 154(b) by 534 days.

(21) Appl. No.: 13/313,439

(22) Filed: Dec. 7, 2011

(65) Prior Publication Data

US 2012/0250495 A1    Oct. 4, 2012

(30) Foreign Application Priority Data

Apr. 4, 2011    (KR) .................. 10-2011-0030618

(51) Int. Cl.
*H04J 3/14*    (2006.01)
*H04L 1/18*    (2006.01)
*H04L 1/16*    (2006.01)

(52) U.S. Cl.
CPC ............ *H04L 1/1819* (2013.01); *H04L 1/1671* (2013.01); *H04L 1/1864* (2013.01)

USPC .......................................................... 370/216

(58) Field of Classification Search
None
See application file for complete search history.

(56) References Cited

U.S. PATENT DOCUMENTS 6,012,159 A  *  1/2000  Fischer et al. ................. 714/755
2012/0287775 A1*  11/2012  Yap et al. ...................... 370/216

FOREIGN PATENT DOCUMENTS

KR    10-2005-0028242 A    3/2005
KR    10-2006-0007841 A    1/2006
KR    10-2007-0073880 A    7/2007

* cited by examiner

*Primary Examiner* — Andrew Lai
*Assistant Examiner* — Leon Andrews
(74) *Attorney, Agent, or Firm* — McDermott Will & Emery LLP

(57) ABSTRACT

A method includes continuously receiving N data frames encoded from K source data packets by an erasure coding method; checking for errors in the received N data frames; and transmitting an acknowledge (ACK) message informing that the source data packets are capable of being restored, when the number (R) of data frames not containing errors is equal to or greater than the number (K) of source data packets, and transmitting an ACK message including the number (X) of data frames for which retransmission is to be requested when the number (R) of data frames not containing errors is less than the number (K) of source data packets, as a result of the checking.

8 Claims, 3 Drawing Sheets

METHOD OF REDUCING RETRANSMISSION OF DATA FRAME AND RECEIVING NODE THEREFOR

CROSS-REFERENCE TO RELATED APPLICATIONS

This application claims the priority of Korean Patent Application No. 10-2011-0030618 filed on Apr. 4, 2011, in the Korean Intellectual Property Office, the disclosure of which is incorporated herein by reference.

BACKGROUND OF THE INVENTION

1. Field of the Invention

The present invention relates to data communication, and more particularly, to a method of reducing a retransmission of a data frame and a receiving node therefor.

2. Description of the Related Art

IEEE 802.15.3 wireless personal area network (WPAN) is a technology standard for the purpose of transmitting high quality large scale data such as multimedia in real time in a wireless network environment of about 10 meters. IEEE 802.15.3 standard has been developed in order to overcome disadvantages of the IEEE 802.15.1 standard which supported significantly limited data transmission and to support connections in an Ad-hoc form between devices capable of transmitting multimedia data.

As acknowledge frame (ACK) schemes used in IEEE 802.15.3 media access control (MAC), a total of three ACK schemes were included, including a No-ACK scheme in which an ACK is not used, an immediate ACK (Imm-ACK) scheme in which one ACK is used in one data frame, and a delay ACK (Dly-ACK) scheme in which one ACK is used in several data frames.

Among them, the Dly-ACK scheme is a scheme in which a receiving node transmits one ACK frame after continuously receiving several data frames. Therefore, the Dly-ACK scheme may reduce overhead due to the ACK frame, as compared to the Imm-ACK scheme in which the ACK frame needs to be transmitted for each of the received data frames.

However, when there are errors (that is, transmission failures) in some of the continuously received data frames, a receiving node needs to request that a transmitting node retransmits the data frame containing the errors, and the entire performance of the network may be deteriorated due to the data frame retransmitted from the transmitting node.

SUMMARY OF THE INVENTION

An aspect of the present invention provides a method of reducing a retransmission of a data frame, in which even in the case that there are errors in some of data frames transmitted by a transmitting node when the data frames are transmitted or received by a Dly-ACK scheme, source data may be restored without requesting the retransmission of the data frame, and a receiving node therefor.

Another aspect of the present invention provides a method of reducing a retransmission of a data frame, in which source data may be restored within a rapid time and an unnecessary waste of bandwidth may be reduced, and a receiving node therefor.

According to an aspect of the present invention, there is provided a method of reducing a retransmission of a data frame, the method including: continuously receiving N data frames generated by encoding K source data packets by an erasure coding method; checking for errors in the received N data frames; and transmitting an ACK message informing that the source data packets are capable of being restored, when the number (R) of data frames not containing errors is equal to or greater than the number (K) of source data packets, and transmitting an ACK message including the number (X) of data frames for which retransmission is to be requested when the number (R) of data frames not containing errors is less than the number (K) of source data packets, as a result of the checking.

The number (X) of the data frames for which retransmission is to be requested may satisfy K−R<X<N−R, where N indicates the number of the encoded data frames, R indicates the number of the data frames not containing errors, and K indicates the number of the source data packets.

The number (X) of data frames for which retransmission is to be requested may be determined by an a value deducing a minimum value satisfying the following Equation:

$$F(\alpha) = \sum_{k=0}^{\lfloor (N-R)\alpha \rfloor} k \cdot \binom{\lfloor (N-R)\alpha \rfloor}{k}(1-p)^k p^{\lfloor (N-R)\alpha \rfloor - k} +$$

$$(1-p)\{(N-R)\alpha - \lfloor (N-R)\alpha \rfloor\} \geq K - R,$$

where N indicates the number of the encoded data frames, R indicates the number of the data frames not containing errors, K indicates the number of source data packets, and p indicates a reception failure rate of the data frames, wherein the reception failure rate (p) may be determined by a state of a channel through which the data frames are transmitted.

The transmitting of the ACK message may further include restoring the source data packets only from the data frames not containing errors, when the number (R) of the data frames not containing errors is equal to or greater than the number (K) of the source data packets.

The transmitting of the ACK message may further include restoring the source data packets from data frames received based on the transmitted ACK message and the data frames not containing errors.

According to another aspect of the present invention, there is provided a receiving node for reducing a retransmission of a data frame, the receiving node including: a communicating module continuously receiving N data frames generated by encoding K source data packets by an erasure coding method; an error checking module checking for errors in the received N data frames; and a controlling module transmitting an ACK message informing that the source data packets are capable of being restored, when the number (R) of data frames not containing errors is equal to or greater than the number (K) of source data packets, and transmitting an ACK message including the number (X) of data frames for which retransmission is to be requested when the number (R) of data frames not containing errors is less than the number (K) of source data packets, as a result of the checking.

The number (X) of the data frames for which retransmission is to be requested may satisfy K−R<X<N−R, where N indicates the number of the encoded data frames, R indicates the number of the data frames not containing errors, and K indicates the number of the source data packets.

The number (X) of the data frames for which retransmission is to be requested may be determined by an a value deducing a minimum value satisfying the following Equation:

$$F(\alpha) = \sum_{k=0}^{\lfloor(N-R)\alpha\rfloor} k \cdot \binom{\lfloor(N-R)\alpha\rfloor}{k}(1-p)^k p^{\lfloor(N-R)\alpha\rfloor-k} +$$

$$(1-p)\{(N-R)\alpha - \lfloor(N-R)\alpha\rfloor\} \ge K - R,$$

where N indicates the number of the encoded data frames, R indicates the number of the data frames not containing errors, K indicates the number of the source data packets, and p indicates a reception failure rate of the data frames.

The receiving node may further include a decoder restoring the source data packets only from the data frames not containing errors, when the number (R) of data frames not containing errors is equal to or greater than the number (K) of source data packets.

The receiving node may further include a decoder restoring the source data packets from the received data frames and the data frames not containing errors.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
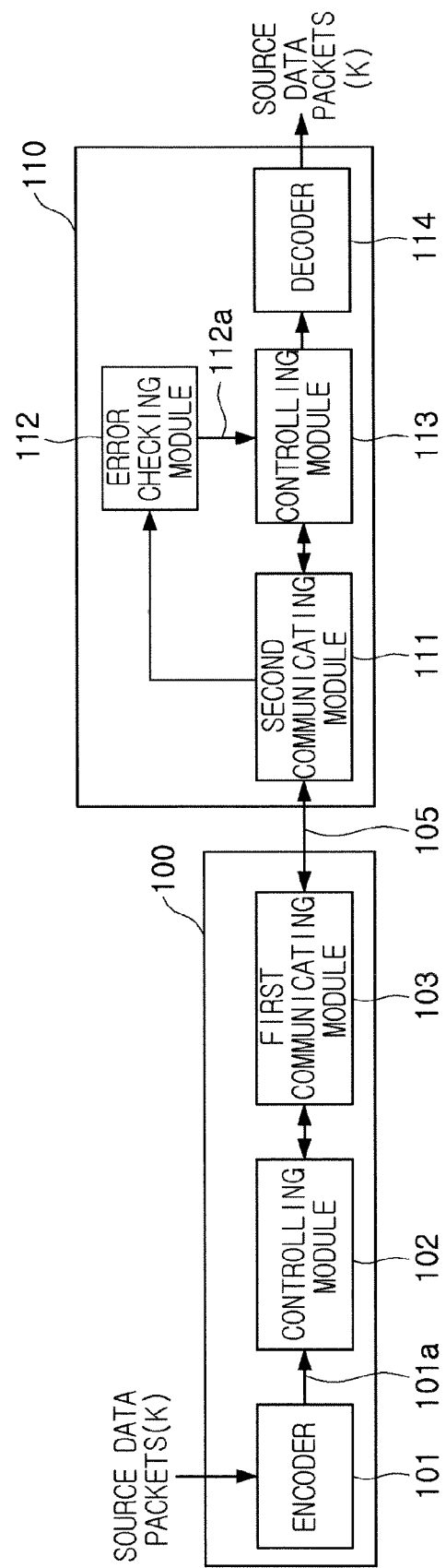
FIG. 1 is a view showing a configuration of the entire system including a receiving node according to an embodiment of the present invention.

Various embodiments of the present invention will be described in detail with reference to the accompanying drawings. However, the embodiments of the present invention may be modified in many different forms and the scope of the invention should not be limited to the embodiments set forth herein. These embodiments of the present invention are provided in order to more completely describe the present invention to those skilled in the art. Therefore, it is to be noted that the shape and size of components shown in the drawings may be exaggerated in order to provide a more clear description.

Figure 3:
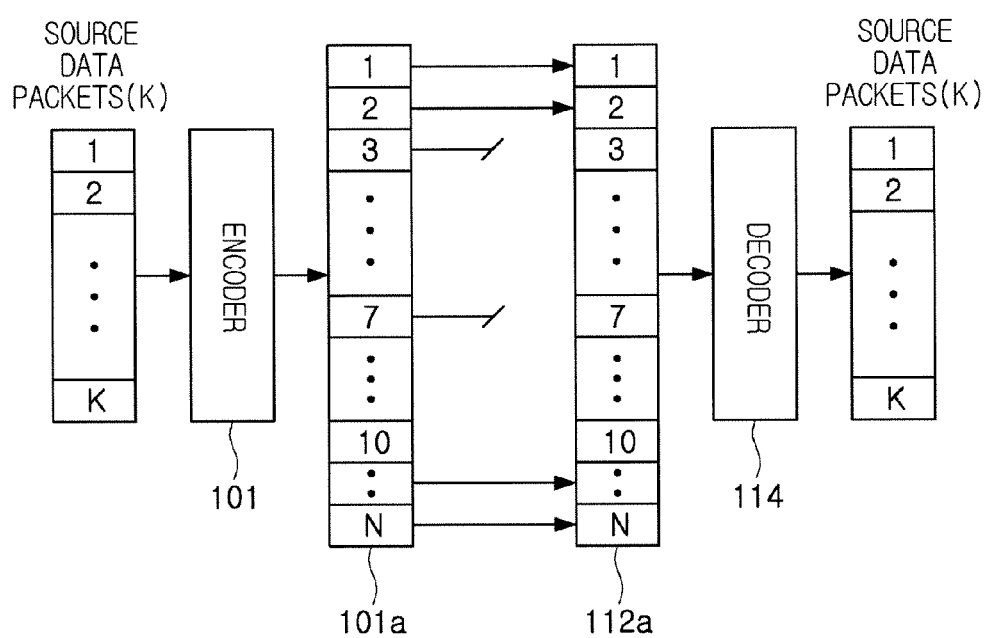
FIG. 3 is a conceptual view describing erasure coding according to an embodiment of the present invention.

FIG. 1 is a view showing a configuration of the entire system including a receiving node for reducing a retransmission of a data frame according to an embodiment of the present invention. Referring to FIG. 1, the entire system may include a transmitting node 100 and a receiving node 110. The transmitting node 100 may include an encoder 101, a controlling module 102, and a first communicating module 103. The receiving node 110 may include a second communicating module 111, an error checking module 112, a controlling module 113, and a decoder 114. FIG. 3 is a conceptual view describing erasure coding according to an embodiment of the present invention.

Referring to FIG. 1, the encoder 101 of the transmitting node 100 may encode K source data packets by an erasure coding method to thereby generate N data frames (Where K≤N). The generated N data frames may be transferred to the controlling module 102. Here, the "erasure coding method" indicates a scheme of adding additional bits to the K source data packets to thereby generate N new data frames. The generated N data frames may be referred to as a 'transmission group'. Hereinafter, the 'erasure coding method' will be described with reference to FIG. 3.

Referring to FIGS. 1 and 3, when the number of source data packets that the transmitting node 100 is to transmit is K, the source data packets passes through the encoder 101 of the transmitting node 100 and then N data frames 101A may be generated. The generated N data frames 101A may be transmitted to the receiving node 110 through the first communicating module 103. At this time, some of the N data frames 101A may be lost in a transmission process according to a state of the channel 105, and the receiving node 110 may actually successfully receive only R data frames 112A of the N data frames 101A. Unlike the general coding method, with the erasure coding method according to an embodiment of the present invention, the decoder 114 of the receiving node 110 may completely restore the K source data packets only from the actually received R data frames 112A. As described above, in the embodiment of the present invention, the erasure coding method is used, whereby even in the case that there are errors in some of the data frames transmitted from the transmitting node 100, the source data may be restored without requesting the retransmission of the data frame.

Again referring to FIG. 1, the controlling module 102 of the transmitting node 100 may transfer the N data frames 101A transferred from the encoder 101 to the first communicating module 103. Meanwhile, according to the embodiment of the present invention, the controlling module 102 may transmit a 'Dly-ACK frame' to the receiving node 110 through the first communicating module 103 in order to apply a Dly-ACK scheme. The 'Dly-ACK frame' indicates a frame requesting buffer information (for example, a size of a buffer) of the receiving node 110, simultaneously with informing the receiving node 110 that the data will be transmitted by the Dly-ACK scheme.

Meanwhile, when an ACK frame is received from the receiving node 110 in response to the 'Dly-ACK frame', the controlling module 102 of the transmitting node 100 may determine a size of a burst in which the source data is to be transmitted at a time, based on the buffer information of the receiving node 110 included in the ACK frame, and the encoder 101 may generate a predetermined number (here, N) of data frames from the K source data packets, based on the determined size of the burst. Then, the N data frames may be continuously transmitted to the receiving node 110. Meanwhile, the last data frame of the N data frames may include information informing of the next burst transmission request together with information informing that the corresponding burst ends.

Finally, the first communicating module 103 of the transmitting node 100 transmits the N data frames 101A to the receiving node 110 through the channel 105 under the control of the controlling module 102.

Meanwhile, the second communicating module 111 of the receiving node 110 may continuously receive the N data frames transmitted from the transmitting node 100 and transfer the received N data frames to the error checking module 112 under the control of the controlling module 113.

The error checking module 112 of the receiving node 110 may check for errors in the N data frames simultaneously with storing the N data frames transferred from the second communicating module 111 in a buffer (not shown) within the error checking module 112, under the control of the controlling module 113. A checking result may be transferred to the controlling module 113. As a method of checking the errors in the data frames, by way of an example, a parity code checking method, a checksum checking method, a cyclic redundancy checking (CRC) method, or the like, may be used. Among these methods, the cyclic redundancy checking (CRC) method may detect errors, even in the case in which several bits of the errors are revealed at a time, unlike the parity code checking method or the checksum checking method, and has an overhead smaller than those of the parity code checking method and the checksum checking method. According to the embodiment of the present invention, although errors in the data frame may be checked using the cyclic redundancy checking (CRC) method, the present invention is not necessarily limited thereto. Errors in the data frame may also be checked by using the parity code checking method or the checksum checking method.

When the number (R) of the data frames not containing errors is equal to or greater than the number (K) of source data packets, the controlling module 113 of the receiving node 110 may transmit an ACK message informing that the source data packets may be restored to the transmitting node 100 through the second communicating module 111, and when the number (R) of the data frames not containing errors is less than the number (K) of source data packets, the controlling module 113 of the receiving node 110 may transmit an ACK message including the number (X) of the data frames for which retransmission is to be requested, to the transmitting node 100 through the second communicating module 111. In addition, the controlling module 113 may transfer the data frames transferred from the error checking module 112 to the decoder 114, which is an upper layer.

Meanwhile, the number (X) of the data frames for which retransmission is to be requested may satisfy the following Equation 1.

$$K-R < X < N-R$$ [Equation 1]

Where N may indicate the number of encoded data frames, R may indicate the number of data frames not containing errors, and K may indicate the number of source data packets.

Alternatively, the number (X) of the data frames for which retransmission is to be requested may be determined as a minimum value satisfying the following Equation 2.

$$F(\alpha) \geq K-R$$ [Equation 2]

That is, the number (X) of data frames for which retransmission is to be requested may be determined by a α value deducing the minimum value satisfying Equation 2, and each of the N–R data frames for which transmission fails is retransmitted in a probability of α. That is, (N–R)α data frames are retransmitted on average.

Where $F(\alpha)$ indicates the number of data frames expected to be successfully received when they are retransmitted in a probability of α and may be calculated by the following Equation 3.

$$F(\alpha) = \sum_{k=0}^{\lfloor (N-R)\alpha \rfloor} k \cdot \binom{\lfloor (N-R)\alpha \rfloor}{k} (1-p)^k p^{\lfloor (N-R)\alpha \rfloor - k} +$$

$$(1-p)\{(N-R)\alpha - \lfloor (N-R)\alpha \rfloor\}$$

[Equation 3]

Where N may indicate the number of encoded data frames, R may indicate the number of data frames not containing errors, K may indicate the number of source data packets, and p may indicate a reception failure rate of the data frames. Meanwhile, the reception failure rate p may be changed according to a state of the channel 105.

Meanwhile, the decoder 114 of the receiving node 110 restores the data frames transferred from the controlling module 113 to the source data packets. According to the embodiment of the present invention, the decoder 114 may restore the source data packets only from the data frames not containing errors, when the number (R) of data frames not containing errors is equal to or greater than the number (K) of source data packets. According to another embodiment of the present invention, the decoder 114 may restore source data packets from additionally received data frames and received data frames not containing errors, when the number (R) of data frames not containing errors is less than the number (K) of source data packets.

The source data packets may be restored only from data frames not containing errors.

Figure 2:
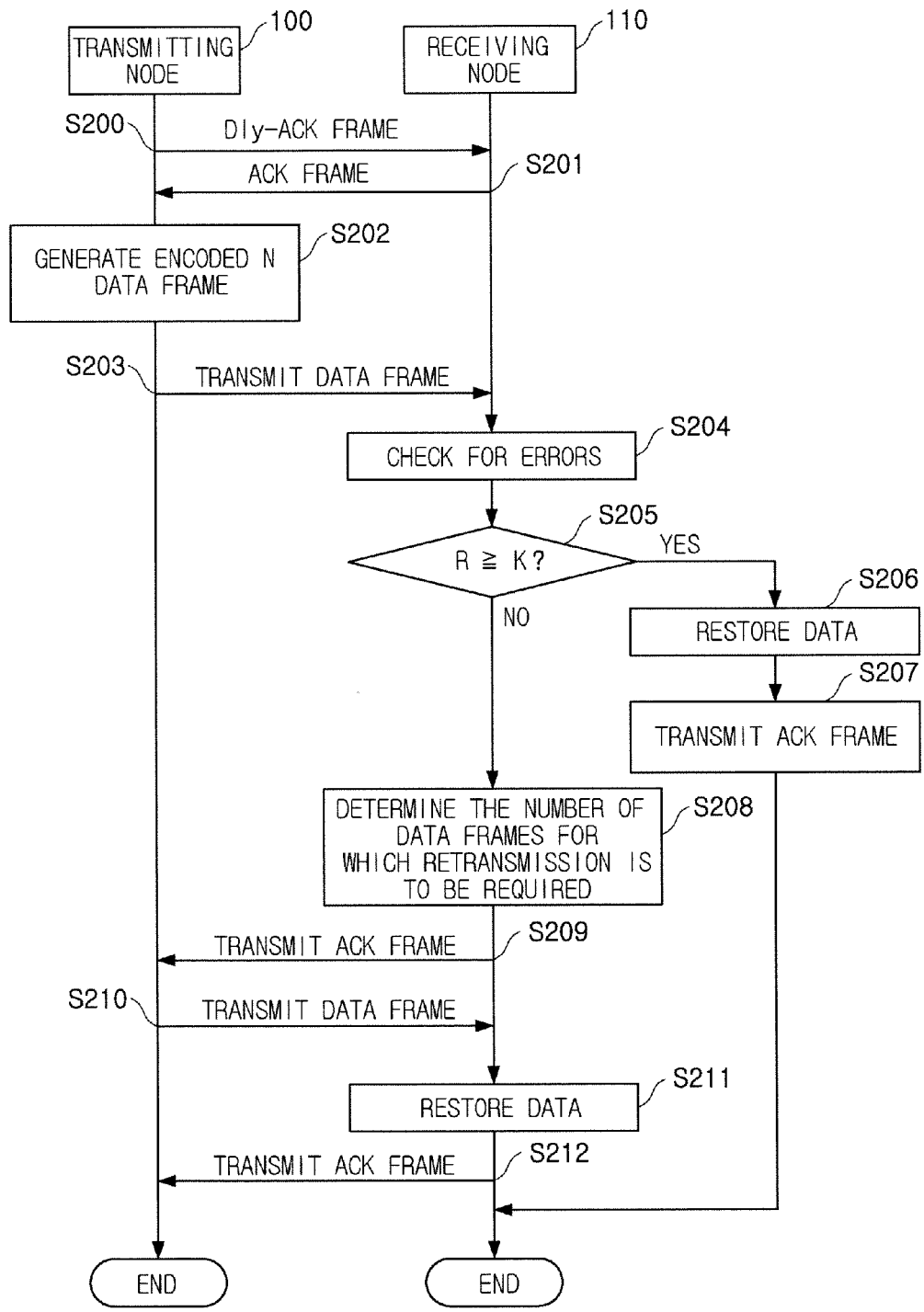
FIG. 2 is a flowchart describing a method of reducing a retransmission of a data frame according to an embodiment of the present invention.

FIG. 2 is a flowchart describing a method of reducing a retransmission of a data frame according to an embodiment of the present invention.

Hereinafter, an operation according to an embodiment of the present invention will be described in detail with reference to FIGS. 1 through 3.

Referring to FIGS. 1 through 3, in operation S200, the controlling module 102 of the transmitting node 100 may transmit the 'Dly-ACK frame' to the receiving node 110. The 'Dly-ACK frame' indicates a frame requesting buffer information (for example, a size of a buffer) of the receiving node 110 simultaneously with informing the receiving node 110 that the data will be transmitted by the Dly-ACK scheme.

Then, in operation S201, the controlling module 113 of the receiving node 110 may generate the ACK frame including the buffer information of the receiving node 110 and transmit the ACK frame to the transmitting node 110.

In operation S202, the controlling module 102 of the transmitting node 100 may determine a size of a burst in which the source data packets are to be transmitted at a time, based on the buffer information of the receiving node 110 included in the ACK frame, and the encoder 101 may generate the N data frames by encoding the K source data packets by the 'erasure coding' method based on the determined size of the burst.

In operation S203, the controlling module 102 of the transmitting node 100 may continuously transmit the encoded N data frames to the receiving node 110 through the channel 105.

In operation S204, the error checking module 112 of the receiving node 110 may check errors in the encoded N data frames. A checking result may be transferred to the controlling module 113 of the receiving node 110. According to the embodiment of the present invention, although the error checking module 112 may check for errors in the data frame using the cyclic redundancy checking (CRC) method, the present invention is not necessarily limited thereto. The error checking module 112 may also check for errors in the data frame using the parity code checking method or the checksum checking method.

Then, in operation S205, the controlling module 113 of the receiving node 110 may determine that the number (R) of successfully received data frames (that is, the data frames not containing errors) is equal to or greater than the number (K) of source data packets, based on error checking results transferred from the error checking module 112. As a result of the determination, when the number (R) of successfully received data frames is equal to or greater than the number (K) of source data packets, a process proceeds to operation S206, and when the number (R) of successfully received data frames is less than the number (K) of source data packets, the process proceeds to operation S208.

In operation S206, the number (R) of successfully received data frames (that is, data frames not containing errors) is equal to or greater than the number (K) of source data packets, such that the decoder 114 of the receiving node 110 may restore the source data packets only from the successfully received data frames. In this manner, according to the embodiment of the present invention, the erasure coding method is used, whereby even in the case that there are errors in some of the data frames transmitted from the transmitting node 100, the source data packets may be restored without requesting retransmission of the data frame.

Next, in operation S207, when the number (R) of data frames not containing errors is equal to or greater than the number (K) of source data packets, the controlling module 113 of the receiving node 110 transmits the ACK message informing that the source data packets may be restored, to the transmitting node 110 through the second communicating module 111.

Meanwhile, in operation S208, when the number (R) of successfully received data frames (that is, data frames not containing errors) is less than the number (K) of source data packets, the controlling module 113 of the receiving node 110 may determine the number (X) of data frames for which retransmission is to be requested, based on the following Equation 1.

Meanwhile, the number (X) of the data frames for which retransmission is to be requested may satisfy the following Equation 1.

$$K-R < X < N-R \quad \text{[Equation 1]}$$

Where N may indicate the number of encoded data frames, R may indicate the number of data frames not containing errors, and K may indicate the number of source data packets.

Alternatively, the number (X) of the data frames for which retransmission is to be requested may be determined as a minimum value satisfying the following Equation 2.

$$F(\alpha) \geq K-R \quad \text{[Equation 2]}$$

That is, the number (X) of the data frames for which retransmission is to be requested may be determined by a α value deducing the minimum value satisfying Equation 2, and each of the N−R data frames for which transmission fails is retransmitted in a probability of α. That is, (N−R)α data frames are retransmitted on average.

Where F(α) indicates the number of data frames expected to be successfully received when they are retransmitted in a probability of α and may be calculated by the following Equation 3.

$$F(\alpha) = \sum_{k=0}^{\lfloor (N-R)\alpha \rfloor} k \cdot \binom{\lfloor (N-R)\alpha \rfloor}{k} (1-p)^k p^{\lfloor (N-R)\alpha \rfloor - k} + \quad \text{[Equation 3]}$$

$$(1-p)\{(N-R)\alpha - \lfloor (N-R)\alpha \rfloor\}$$

Where N may indicate the number of encoded data frames, R may indicate the number of data frames not containing errors, K may indicate the number of source data packets, and p may indicate a reception failure rate of the data frames. Meanwhile, the reception failure rate p may be changed according to a state of the channel 105.

However, when the state of the channel 105 is deteriorated, whereby a minimum requirement (K−R) is not satisfied, the number (N−R) of all data frames lost during a transmission process may be set to X.

As set forth above, in the case that the retransmission of the data frame is requested, the transmission of the minimum amount of data frames required for restoration is requested, whereby the source data packets may be restored within a rapid time and unnecessary waste of a bandwidth may be reduced.

Then, in operation S209, the controlling module 113 of the receiving node 110 may transmit the ACK frame including the number (X) of data frames for which retransmission is to be requested to the transmitting node 110.

In operation 5210, the controlling module 102 of the transmitting node 100 may transmit the X data frames for which retransmission is requested to the receiving node 110.

Then, in operation 5211, the decoder 114 of the receiving node 110 may restore the source data packets from additionally received data frames and the data frames not containing errors and received in the operation S203.

Finally, in operation 5212, the controlling module 113 of the receiving node 110 may transmit the ACK message informing that the source data packets may be restored, to the transmitting node 100 through the second communicating module 111.

As set forth above, according to the embodiments of the present invention, data is coded by an erasure coding method, whereby even in the case that there are errors in some of data frames transmitted from the transmitting node, source data could be restored without requesting the retransmission of the data frame.

In addition, according to the embodiments of the present invention, even in the case that the retransmission of the data frame is requested, the transmission of the minimum amount of data frames required for restoration is requested, whereby source data could be restored within a rapid time and the unnecessary waste of bandwidth may be reduced.

While the present invention has been described in connection with the embodiments thereof, various modifications and variations can be made without departing from the scope of the present invention. Therefore, the scope of the present invention should be not construed as being limited to the described embodiments but be defined by the appended claims as well as equivalents thereto.

What is claimed is:

1. A method of reducing a retransmission of a data frame, the method comprising:

continuously receiving, in a communicating module, data frames encoded from source data packets by an erasure coding method;

checking, in an error checking module, for errors in the received data frames; and transmitting, in a controlling module, an acknowledge (ACK) message informing that the source data packets are capable of being restored, when a number (R) of data frames not containing errors is equal to or greater than a number (K) of source data packets, and transmitting an ACK message including a number (X) of data frames for which retransmission is to be requested when the number (R) of data frames not containing errors is less than the number (K) of source data packets, as a result of the checking, wherein the number (X) of the data frames for which retransmission is to be requested satisfies K−R<X<N−R, where N indicates a number of the encoded data frames, R indicates the number of the data frames not containing errors, and K indicates the number of the source data packets.

2. The method of claim 1, wherein the number (X) of data frames for which retransmission is to be requested is determined by a value α deducing a minimum value satisfying the following Equation:

$$F(\alpha) = \sum_{k=0}^{\lfloor(N-R)\alpha\rfloor} k \cdot \binom{\lfloor(N-R)\alpha\rfloor}{k}(1-p)^k p^{\lfloor(N-R)\alpha\rfloor-k} + (1-p)\{(N-R)\alpha - \lfloor(N-R)\alpha\rfloor\} \geq K-R,$$

where F(α) indicates a number of data frames expected to be successfully received when the data frames are retransmitted in a probability of α, N indicates the number of the encoded data frames, R indicates the number of the data frames not containing errors, K indicates the number of source data packets, k is a number of successfully received data frames, and p indicates a reception failure rate of the data frames.

3. The method of claim 1, wherein the transmitting, in the controlling module, of the ACK message further includes restoring the source data packets only from the data frames not containing errors, when the number (R) of the data frames not containing errors is equal to or greater than the number (K) of the source data packets.

4. The method of claim 1, wherein the transmitting, in the controlling module, of the ACK message further includes restoring the source data packets from data frames received based on the transmitted ACK message and the data frames not containing errors.

5. A receiving node for reducing a retransmission of a data frame, the receiving node comprising:
a communicating module continuously receiving data frames encoded from source data packets by an erasure coding method;
an error checking module checking for errors in the received data frames; and
a controlling module transmitting an acknowledge (ACK) message informing that the source data packets are capable of being restored, when a number (R) of data frames not containing errors is equal to or greater than a number (K) of source data packets, and transmitting an ACK message including a number (X) of data frames for which retransmission is to be requested when the number (R) of data frames not containing errors is less than the number (K) of source data packets, as a result of the checking,
wherein the number (X) of the data frames for which retransmission is to be requested satisfies K−R<X<N−R, where N indicates a number of the encoded data frames, R indicates the number of the data frames not containing errors, and K indicates the number of the source data packets.

6. The receiving node of claim 5, wherein the number (X) of the data frames for which retransmission is to be requested is determined by a value α deducing a minimum value satisfying the following Equation:

$$F(\alpha) = \sum_{k=0}^{\lfloor(N-R)\alpha\rfloor} k \cdot \binom{\lfloor(N-R)\alpha\rfloor}{k}(1-p)^k p^{\lfloor(N-R)\alpha\rfloor-k} + (1-p)\{(N-R)\alpha - \lfloor(N-R)\alpha\rfloor\} \geq K-R,$$

where F(α) indicates a number of data frames expected to be successfully received when the data frames are retransmitted in a probability of α, N indicates the number of the encoded data frames, R indicates the number of the data frames not containing errors, K indicates the number of the source data packets, k is a number of successfully received data frames, and p indicates a reception failure rate of the data frames.

7. The receiving node of claim 5, further comprising a decoder restoring the source data packets only from the data frames not containing errors, when the number (R) of data frames not containing errors is equal to or greater than the number (K) of source data packets.

8. The receiving node of claim 5, further comprising a decoder restoring the source data packets from the received data frames and the data frames not containing errors.

* * * * *